Aug. 11, 1925.
W. LEVVA
1,549,673
EDUCATIONAL DEVICE
Filed April 4, 1924   2 Sheets-Sheet 2
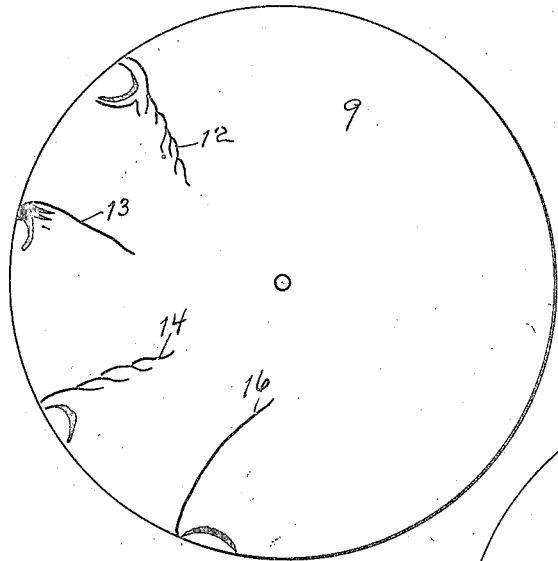
Fig. II.
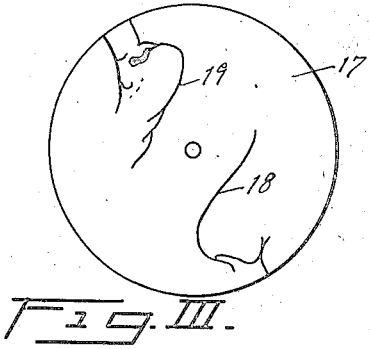
Fig. III.
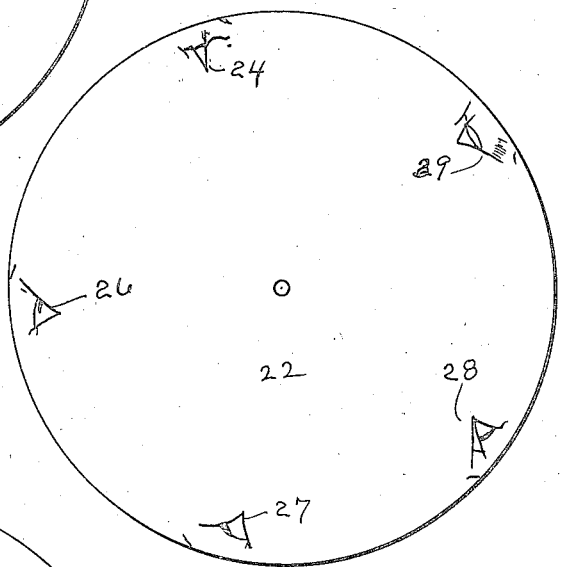
Fig. IV.
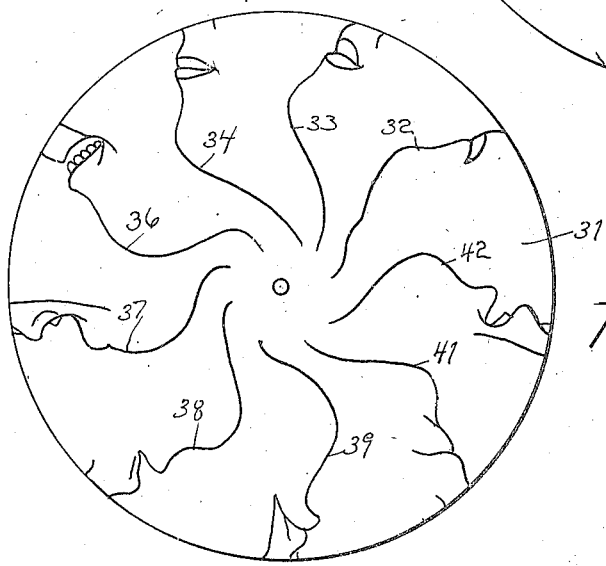
Fig. V.
INVENTOR.
WARD LEVVA
BY
ATTORNEY.

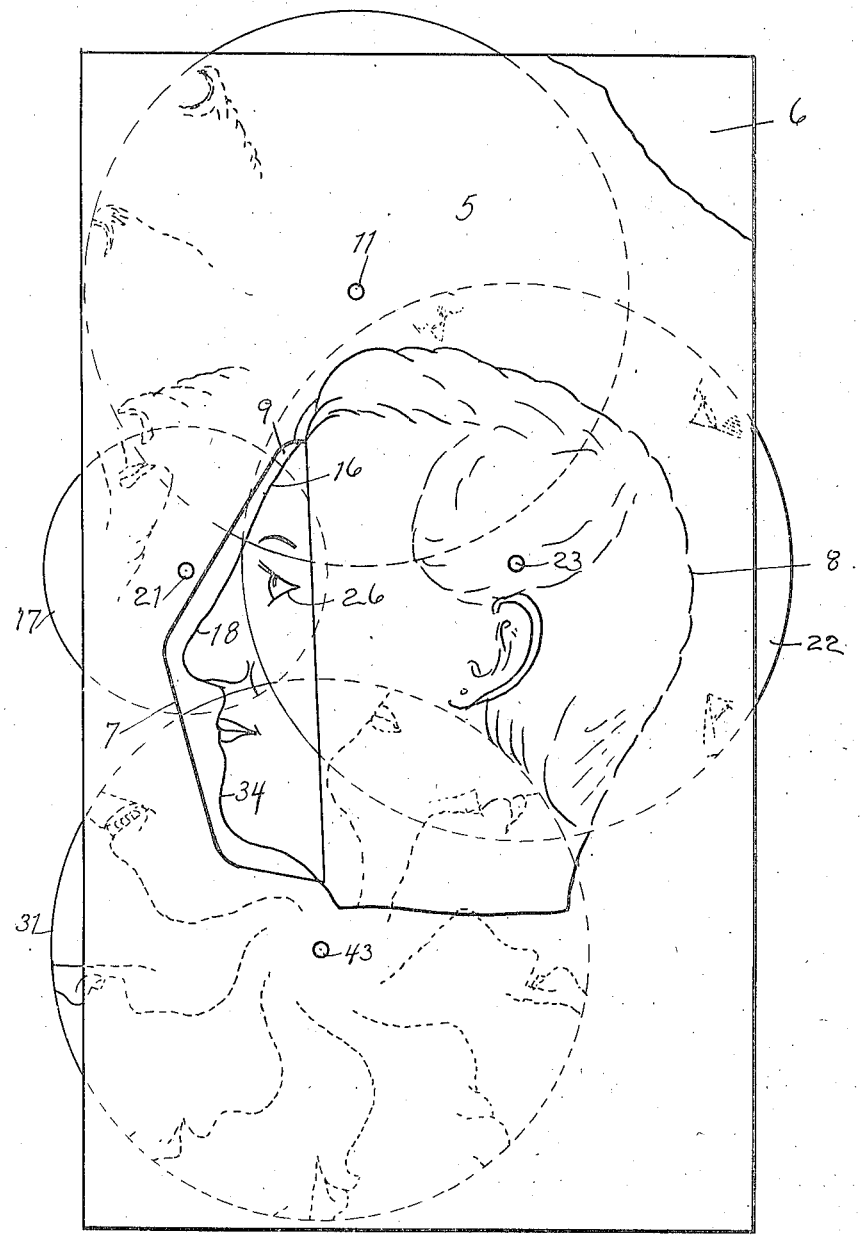

Patented Aug. 11, 1925.

1,549,673

UNITED STATES PATENT OFFICE.

WARD LEVVA, OF SAN FRANCISCO, CALIFORNIA.

EDUCATIONAL DEVICE.

Application filed April 4, 1924. Serial No. 704,220.

*To all whom it may concern:*

Be it known that I, WARD LEVVA, a citizen of the United States, residing at San Francisco, in the county of San Francisco and State of California, have invented new and useful Improvements in Educational Devices, of which the following is a specification.

This invention relates to improvements in educational devices and has particular reference to a device for studying the profile of a person so as to familiarize the student with the various facial expressions which are possible.

The principal object of this invention is to produce means which will readily disclose to the observer varying human expressions, which means is in the form of a device which is economical to manufacture, simple to operate and highly entertaining.

An additional object of this invention is to provide a device of the character described whereby the observer can direct his undivided attention to one particular facial expression, with the other possible expressions being hidden from view and ready to be successively registered upon manual actuation of the device.

Another object is to produce a device wherein the discs may be readily changed so as to secure larger or different combinations when desired.

Other objects and advantages will be apparent during the course of the following description.

In the accompanying drawings forming a part of this specification, and in which like numerals are employed to designate like parts throughout the same, Figure I is a front elevation of my device, Figure II is a plan view of a disc having brow expressions thereon, Figure III is a disc having nose expressions thereon, Figure IV is a disc having eye expressions thereon, and Figure V is a disc having mouth and chin expressions thereon.

At the present time in studying analysis and like subjects, it is customary for the instructor to employ charts, it requiring a separate chart to illustrate each phase of the analysis. Applicant has therefore provided a simple chart capable of combining the various expressions illustrated upon separate discs thereby forming a composite face and thereby eliminating the necessity of a large number of charts.

In the accompanying drawings wherein for the purpose of illustration is shown a preferred embodiment of my invention, the numeral 5 designates a front plate and the numeral 6 a back plate. A window 7 is provided within the front plate, through which window a portion of a plurality of discs may be viewed.

The front plate 5 has printed or otherwise formed thereon, the outline of a head as shown at 8. At 9 I have shown a disc pivoted as at 11 between the front and back plates 5 and 6, which disc has formed thereon brow expressions as shown at 12, 13, 14 and 16. A portion of this disc is adapted to be exposed through the window 7 as shown in Figure 1.

A disc of smaller diameter is illustrated in Figure 3, which disc is designated by the numeral 17 and has formed thereon nose expressions as shown at 18 and 19. This disc is pivoted at 21 so that a portion thereof is exposed through the window 7, (see Figure 1).

At 22 I have shown a disc pivoted as at 23, which disc has formed thereon various eye expressions see 24, 26, 27, 28 and 29 of Figure 4. A portion of this disc is likewise adapted to be exposed through the window 7.

At 31 I have shown a disc having a plurality of mouth and chin expressions formed thereon. These expressions are designated at 32, 33, 34, 36, 37, 38, 39, 41 and 42. This disc is pivoted at 43 and is adapted to have a portion exposed through the window 7. The result of this construction and the positioning of the various discs serves to form a composite profile, as shown in Figure I.

The periphery of each disc is exposed for a short distance at a point outside the outer margin of the front and back plates 5 and 6 which enables the operator to rotate the respective discs upon their pivots.

It is to be understood that the form of my invention herewith shown and described is to be taken as a preferred example of the same and that various changes in the shape, size and arrangement of parts may be resorted to without departing from the spirit of the invention or the scope of the subjoined claim.

Having thus described my invention, I claim:—

A device of the character described comprising a substantially rectangular front plate having an aperture formed therein, a portion of a human face displayed thereon, a plurality of discs pivotally mounted at the rear of said plate, said discs being of varying diameter, one of said discs having nose expressions thereon, another of said discs having eye expressions thereon, another of said discs having mouth and chin expressions thereon, and the other of said discs having forehead expressions thereon, said said discs being adapted to overlap, the axis of said nose and eye discs being pivoted in substantially horizontal alignment, while the axis of said forehead and chin expression discs are pivoted in a substantially vertical alignment.

In testimony whereof I affix my signature.

WARD LEVVA.